United States Patent [19]

Aoyama et al.

[11] Patent Number: 4,764,766

[45] Date of Patent: Aug. 16, 1988

[54] METHOD FOR DRIVING AND LIQUID CRYSTAL DISPLAY DEVICE INCLUDING DOT MATRIX DISPLAY PART AND FIXED PATTERN DISPLAY PORT

[75] Inventors: Naofumi Aoyama, Mobara; Kiyoshige Kinugawa; Yoshihiro Nozaki, both of Chiba; Hiroshi Sakurada, Mobara, all of Japan

[73] Assignee: Hitachi, Ltd., Tokyo, Japan

[21] Appl. No.: 825,604

[22] Filed: Feb. 3, 1986

[30] Foreign Application Priority Data

Feb. 4, 1985 [JP] Japan ................................ 60-18576

[51] Int. Cl.⁴ .............................................. G09G 3/36
[52] U.S. Cl. ...................................... 340/784; 350/333
[58] Field of Search ............... 340/715, 753, 754, 784; 40/448; 350/332, 333

[56] References Cited

U.S. PATENT DOCUMENTS

| | | | |
|---|---|---|---|
| 3,738,099 | 6/1973 | Tanaka | 340/784 |
| 4,224,615 | 9/1980 | Penz | 340/365 C |
| 4,390,872 | 6/1983 | Murakami et al. | 340/784 |
| 4,412,214 | 10/1983 | Tanaka et al. | 340/784 |

FOREIGN PATENT DOCUMENTS

| | | | |
|---|---|---|---|
| 3036861 | 4/1981 | Fed. Rep. of Germany | 340/784 |
| 0161522 | 10/1982 | Japan | 340/784 |
| 2119994 | 11/1983 | United Kingdom | 340/784 |

Primary Examiner—Gerald L. Brigance
Assistant Examiner—Mahmoud Fatahi-Yar
Attorney, Agent, or Firm—Antonelli, Terry & Wands

[57] ABSTRACT

A method is disclosed for driving a liquid crystal display provided, in the same liquid crystal panel, with a dot matrix display part and a fixed pattern or segment display part. The dot matrix display part is driven in a time-multiplexed fashion, while the fixed pattern or segment display part is driven in a static fashion using driving voltage waveforms in common with the dot matrix display part.

4 Claims, 4 Drawing Sheets

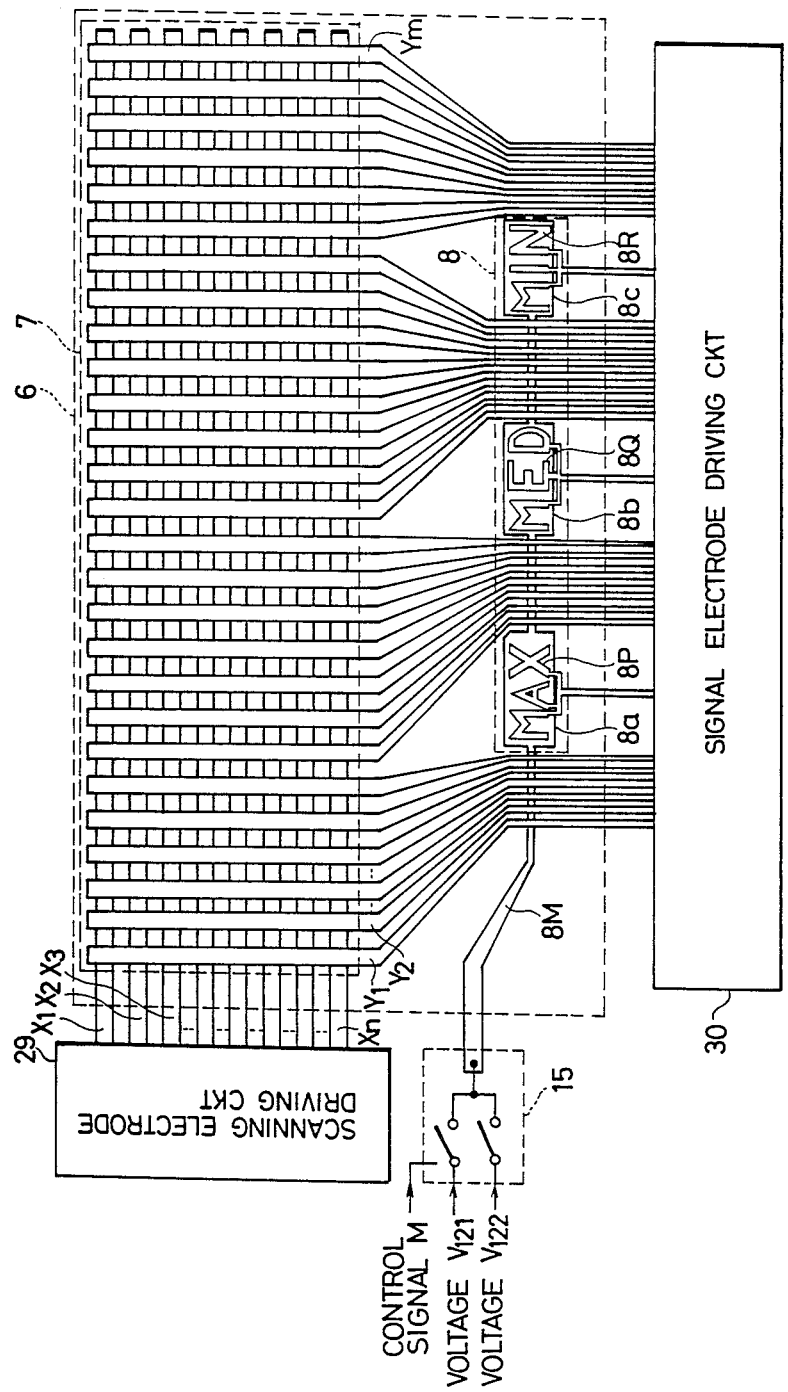

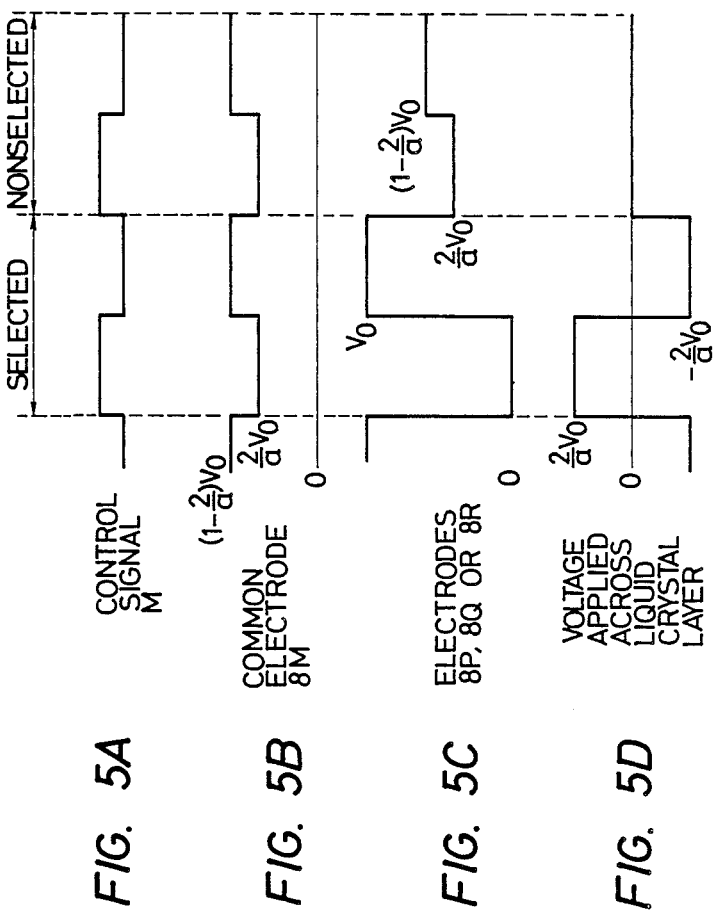

METHOD FOR DRIVING AND LIQUID CRYSTAL DISPLAY DEVICE INCLUDING DOT MATRIX DISPLAY PART AND FIXED PATTERN DISPLAY PORT

BACKGROUND OF THE INVENTION

The present invention relates to a driving method for a liquid crystal display device, and more particularly to a driving method suitable for improving the contrast characteristics when a liquid crystal display which is provided with a dot matrix display part and a fixed pattern display part, or with a segment display part which permits display of letters, numbers and special symbols with stroke or line segments in a single liquid crystal panel, is driven in a highly time-multiplexed fashion. This invention also relates to a liquid crystal display device employing a method according to the present invention.

FIG. 1 is a perspective view of an example of a conventional liquid crystal display device. In FIG. 1, an upper glass substrate 1 is provided with electrodes 3 formed of a transparent conductive coating and a lower glass substrate 2 is also provided with electrodes 4 formed of a transparent conductive coating. A liquid crystal layer 5 is inserted into a space formed between the glass substrates 1 and 2 which is several or several tens of microns thick. In this structure, the electrodes 3 and 4 form a matrix, and the intersections of the electrodes 3 and 4 act as picture elements. The transmitted light intensity of transmissive-type liquid crystal display devices or the reflected light intensity of reflective-type liquid crystal display devices gnerally depends on the effective value of the voltage applied to the liquid crystal. A liquid crystal display is based on principles such as the dynamic scattering mode (DSM) or the field effect mode (FEM). Twisted nematic liquid crystal display devices are currently the most generally used devices. In such a device, as is disclosed in U.S. Pat. Nos. 3,918,796 and 3,731,986, the liquid crystal layer 5 is composed of a nematic liquid crystal material which has a positive dielectric anisotropy and which is formed into a twisted structure in which the major axes of liquid crystal molecules adjacent to the upper glass substrate 1 is perpendicular to the major axes of the liquid crystal molecules adjacent to the lower glass substrate 2. The electro-optic change in the twisted structure which is produced by the application of a voltage across the liquid crystal layer 5 is detected by a pair of polarizing plates disposed in front of and behind the twisted structure.

A line sequential scanning method is generally used as a method for driving the liquid crystal matrix shown in FIG. 1. FIG. 2 shows the state of the display device at a certain time in which scanning electrodes are represented as $X_1$, $X_2$, and $X_3$, while signal electrodes are represented as $Y_1$, $Y_2$ and $Y_3$, though the number of electrodes are six for the sake of simplicity, it can be larger in a practical device. The scanning electrodes $X_1$, $X_2$, and $X_3$ are sequentially selected to provide scanning; in FIG. 2, the electrode $X_2$ is selected, as indicated by the hatching.

A display signal is applied to the signal electrodes, and in this case, the electrode $Y_2$ is selected, as indicated by the hatching.

Hereunder, the state of a picture element 11 which is the intersection of the selected scanning electrode $X_2$ and the selected signal electrode $Y_2$ is referred to as the "selected state", the state of a picture element 12 which is the intersection of the selected scanning electrode $X_2$ and a non-selected signal electrode $Y_1$ or $Y_3$, or the intersection of a non-selected scanning electrode $X_1$ or $X_3$ and the selected signal electrode $Y_2$ is referred to as the "half-selected state", and the state of a picture element 13 which is the intersection of a non-selected scanning electrode $X_1$ or $X_3$ and a non-selected signal electrode $Y_1$ or $Y_3$ is referred to as the "non-selected state".

In an amplitude-selective addressing scheme used as a method of driving the liquid crystal matrix display device, driving voltage are given by $$V_{121} = V_{111} + 2/a\, V_0 \tag{1}$$

$$V_{211} = V_{111} + V_0 \tag{2}$$

$$V_{221} = V_{111} + 1/a\, V_0 \tag{3}$$

$$V_{122} = V_{112} - 2/a\, V_0 \tag{4}$$

$$V_{212} = V_{112} - V_0 \tag{5}$$

$$V_{222} = V_{112} - 1/a\, V_0 \tag{6}$$

Where
  V111 and V112 are voltages alternately applied to a selected signal electrode during a predetermined period,
  V121 and V122 are voltages alternately applied to a non-selected signal electrode during the predetermined period,
  $V_{211}$ and $V_{212}$ are voltages alternately applied to a selected scanning electrode during the predetermined period,
  V221 and V222 are voltages alternately applied to a non-selected scanning electrode during the predetermined period,
  V0 is an amplitude of an alternating voltage applied across liquid crystal layer at a selected picture element,
  a is an arbitrary constant larger than 3,
  V111 and V112 are arbitrarily given and the condition that V111≠−1/a V0 and V112≠−1/a V0.

For example, driving voltages applied to the electrodes alternate between V111 and V112, between V121 and V122, between V211 and V212, and between V221 and V222 in one scanning period for one scanning electrode, or V111, V121, V211 and V221 are applied to the electrodes in one frame period required for scanning all the scanning electrodes and V112, V122, V212 and V222 are applied to the electrodes in the next frame period. Thus the polarity of applied voltages across the liquid crystal layer is periodically reversed so that the liquid crystal layer has no mean DC level applied across it. A reference signal for reversal of polarity of voltages applied across the liquid crystal to yield AC operation of the cell is hereinafter called a control signal M.

The operational margin has its maximum value when the constant a is such that $$a = \sqrt{N} + 1 \tag{7}$$

Where

N is the number of scanning lines. This kind of method is disclosed in U.S. Pat. No. 3,976,362. This driving method is referred to as an "a:1 selection scheme" hereinafter. The effective values $V_{s1}$, $V_{s2}$ of voltage applied at the selected point and the half-selected point is represented by the following formulae and they are constant irrespective of changes in the display pattern.

$$V_{s1} = \frac{V_0}{a} \sqrt{1 + \frac{a^2 - 1}{N}} \tag{8}$$

$$V_{s2} = \frac{V_0}{a} \sqrt{1 + \frac{(a - 2)^2 - 1}{N}} \tag{9}$$

It is obvious from the formulae (8) and (9) that the contrast between the selected point and the non-selected point becomes smaller as the number N of time-multiplexing increases.

There are several methods for displaying letters, numerals and figures by means of a liquid crystal display device. For example, in a dot matrix display system using the liquid crystal display device shown in FIG. 1, by combinations of intersections of the stripe-shaped electrodes 3 and 4, letters, numerals and figures are displayed. When the display is limited to the display of numerals, the numerals 0 to 9 are displayed in a segment display system (U.S. Pat. No. 3,781,863), by selecting appropriate electrodes from among seven segment electrodes arranged in the shape of the figure 8. When the same letter, numeral or figure is displayed constantly, a fixed pattern display system is employed in which electrodes are formed into the shape of the relevant letter, numeral or figure, and voltage is constantly applied to the electrodes.

Because of the recent trend toward the diversification of usages of liquid crystal display devices and the contents of their displays, a need has arisen for displaying on a single liquid crystal display surface, i.e. a liquid crystal panel, by a combination of the dot matrix display system and the segment display system, the dot matrix display system and the fixed pattern display system, or the segment display system and the fixed pattern display system.

For example, as is shown in FIG. 3, a liquid crystal panel 6 is provided with a dot matrix display part 7 and a fixed pattern display part 8. In this example, a group of numerals or a graph is shown in the dot matrix display part 7, and the fixed pattern display part 8 is provided with display parts 8a, 8b and 8c which show that the group of numerals or graph is, for example, the maximum value (MAX), medium value (MED), and minimum value (MIN), respectively.

In the dot matrix display part 7, n scanning electrodes $X_1, X_2, \ldots X_n$ are subsequently selected by a scanning electrode driving circuit 9, and a selected signal electrode voltage or a non-selected signal electrode voltage is applied to the signal electrodes $Y_1, Y_2 \ldots Y_m$ by a signal electrode driving circuit 10 according to information to be displayed.

In the fixed pattern display part 8, an electrode 8M which is common to the display parts 8a, 8b and 8c is selected as the scanning line $X_{n+1}$ which follows the scanning line $X_n$ of the dot matrix display part 7 by the scanning electrode driving circuit 9 in the order of $X_1, X_2, \ldots X_n, X_{n+1}$. Fixed pattern electrodes 8P, 8Q and 8R which are used exclusively for the display parts 8a, 8b and 8c, respectively, are connected to one of the signal electrode $Y_1, Y_2, \ldots Y_m$ of the dot matrix display part 7, and a signal electrode voltage is applied by the signal electrode driving circuit 10. Consequently, the fixed pattern display parts 8a, 8b and 8c are driven in the same way as the picture elements of the dot matrix display part.

In other words, when a conventional liquid crystal panel is provided with both dot matrix display system and fixed pattern display system, the fixed pattern display system is also driven in time-multiplexed fashion with the same duty ratio 1/n+1 as that of the dot matrix display system.

This kind of driving method, however, is disadvantageous in that as the number of time-multiplexing, namely the number of scanning lines (n +1) increases, and the contrast decreases as described before.

The case will now be considered in which the liquid crystal display device shown in FIG. 3 is formed into a reflective type display device by disposing a reflector behind the liquid crystal panel 6, and is driven by the a:1 selection scheme. In the dot matrix display part 7 each selected point is surrounded by a non-selected part, i.e. half-selected elements, and the effective value of voltage applied to the half-selected elements is constant irrespective of changes in the display pattern.

Accordingly, the display luminance of the dot matrix display part 7 consists of only two kinds of luminance, i.e., the luminance of selected points and that of half-selected points, so that there is little possibility of mis-reading the display, even if the number (n+1) of time-multiplexing increases and the contrast between the selected points and the half-selected points thereby drops. Since the fixed pattern display part 8 is surrounded by an area 14 where there are no scanning electrodes or signal electrodes (hereinafter referred to as a "no-electrode area"), there are three kinds of luminance in the fixed pattern display part 8 and its vicinity, namely, the luminance of selected points; the luminance of non-selected points, i.e., half-selected points, and the luminance of the no-electrode area 14, which is not influenced by the applied voltage at all. As a result, when the number (n+1) of time-multiplexing increases, and there is little difference in luminance between the selected points and the half-selected points, the contrast between selected points and no-electrode area 14 appears to be approximately the same contrast between half-selected points and no-electrode area 14, so that there is a strong possibility of misreading a half-selected point as a selected point. For example, in the liquid crystal panel shown in FIG. 3, even when the "MED" in the display part 8b of the fixed display pattern part 8 is selected, if the difference between the effective voltage applied across the liquid crystal layers of the display parts 8a and 8c and that applied across the liquid crystal layer of the display part 8b becomes very small, because of the large number (n+1) of time-multiplexing, the display parts 8a, 8b and 8c appear to have approximately the same contrast with respect to the no-electrode area 14, which acts as a background, so that all of the display parts 8a, 8b and 8c appear to be in the selected state.

SUMMARY OF THE INVENTION

Accordingly, it is an object of the present invention to provide a method for driving a liquid crystal display device which maintains high contrast in a fixed pattern display system and a segment display system even when the device is driven in highly time-multiplexed fashion and thereby preventing misreading, thereby eliminating the above-described problems in the prior art.

It is another object of the present invention to provide a liquid crystal display device employing the method according to the present invention.

To achieve this aim, according to the present invention, a common electrode of a fixed pattern display part and a segment display part are driven independently of a dot matrix display part.

BRIEF DESCRIPTION OF THE DRAWINGS

In the accompanying drawings

FIG. 4 is a schematic view of a liquid crystal display device including peripheral circuits which employs an embodiment of a driving method according to the present invention; and FIGS. 5A to 5D are driving waveforms explaining the principle of the present invention.

DETAILED DESCRIPTION OF THE PREFERRED EMBODIMENT

Figure 1:
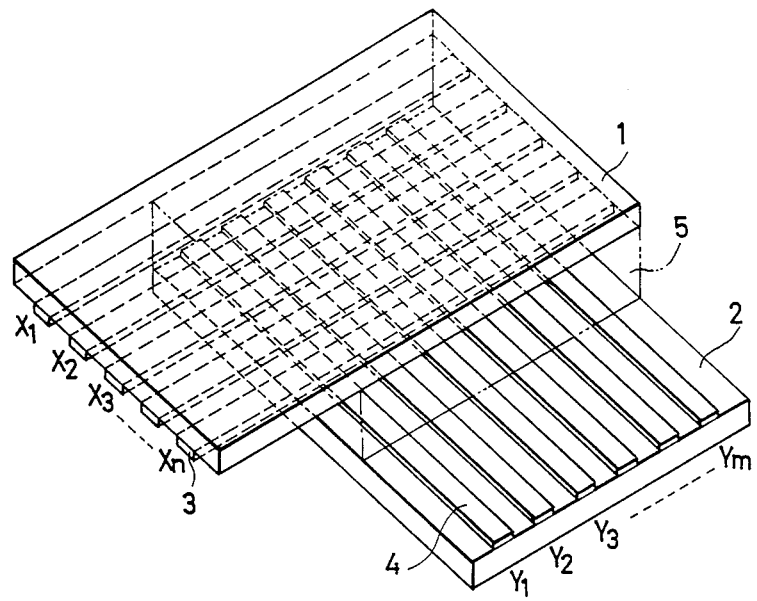
FIG. 1 is a schematic perspective view of a liquid crystal display device.
Figure 2:
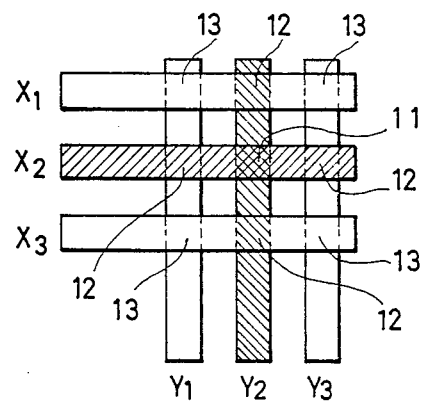
FIG. 2 is an explanatory view of the principle of a method for driving a dot matrix.
Figure 3:
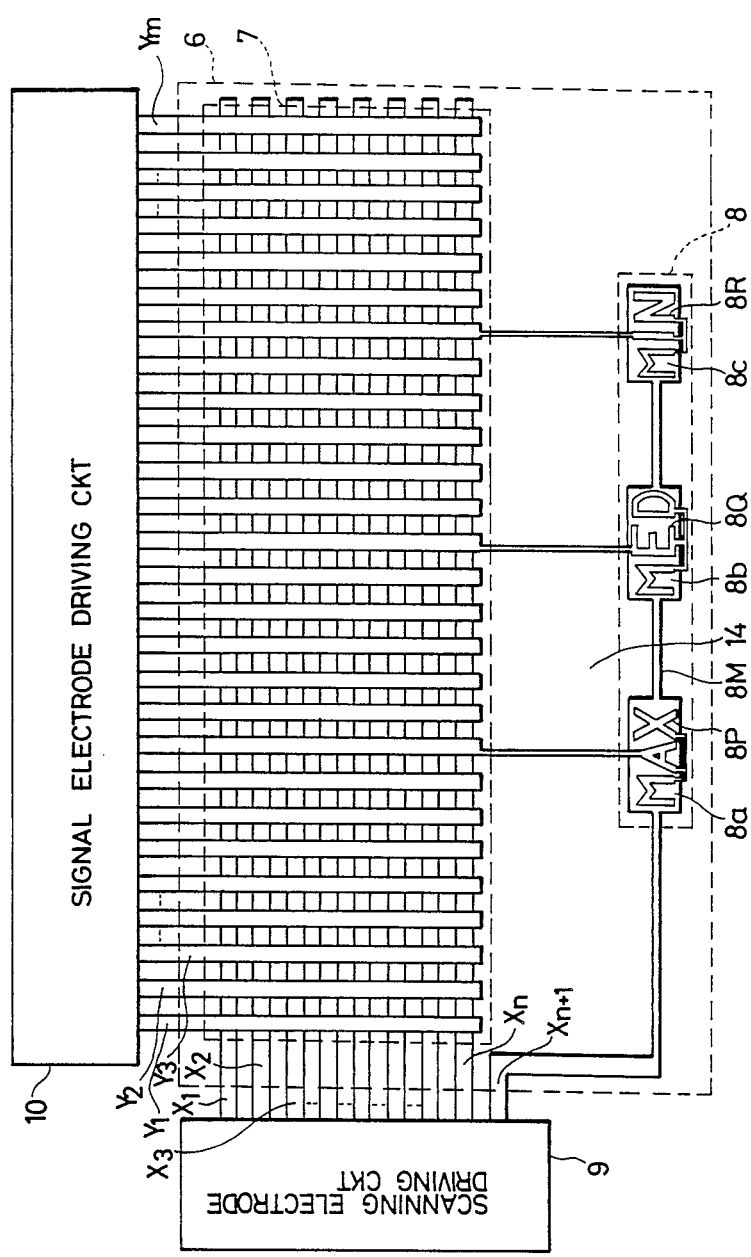
FIG. 3 is a schematic view of a liquid crystal display device including peripheral circuits which employs a conventional driving method.

FIG. 4 shows a liquid crystal display device employing an embodiment of a driving method according to the present invention. In the dot matrix display part 7, n scanning electrodes $X_1, X_2, \ldots X_n$ are, as is the case with the display device shown in FIG. 3, sequentially selected and scanned by a scanning electrode driving circuit 29, and a selected signal electrode voltage or a non-selected electrode voltage is applied to the signal electrodes $Y_1, Y_2, \ldots Y_m$ by a signal electrode driving circuit 30 according to information to be displayed. The display device shown in FIG. 4 is different from that shown in FIG. 3 in that the electrode 8M which is common to the display parts 8a, 8b and 8c of the fixed pattern display part 8 is connected to a common electrode driving circuit 15, in that the fixed pattern electrodes 8P, 8Q and 8R which are exclusively used for the display parts 8a, 8b and 8c, respectively, are not connected to any of the signal electrodes $Y_1, Y_2, \ldots Y_m$ of the dot matrix display part 7, and in that a selected signal electrode voltage or a non-selected signal electrode voltage is applied to the fixed pattern electrodes independently of each other by the signal electrode driving circuit 30.

The dot matrix display part 7 is driven on the basis of the formulae (1) to (6) which are related to the a:1 selection scheme, and the selected signal electrode voltages $V_{111}$, $V_{112}$ are such that $$V_{111} = 0$$

$$V_{112} = V_0$$

the non-selected signal electrode voltages $V_{121}$, $V_{122}$ are such that $$V_{121} = 2/a \, V_0$$

$$V_{122} = (1 - 2/a) \, V_0$$

the selected scanning electrode voltages $V_{211}$, $V_{222}$ are such that $$V_{211} = V_0$$

$$V_{212} = 0$$

and the non-selected scanning electrode voltages $V_{221}$, $V_{222}$ are such that $$V_{221} = 1/a \, V_0$$

$$V_{222} = (1 - 1/a) V_0$$

The alternation of driving voltages between $V_{111}$ and $V_{112}$, $V_{121}$ and $V_{122}$, $V_{211}$ and $V_{212}$, and $V_{221}$ and $V_{222}$ is conducted by the control signal M.

On the other hand, when the fixed pattern 8 is driven, the non-selected signal electrode voltages $V_{121}$, $V_{122}$, which are the same as the one applied to the signal electrodes $Y_1, Y_2, \ldots Y_m$, are inputted to the common electrode driving circuit 15. As is shown in FIGS. 5A and 5B, the common electrode driving circuit 15 alternately applies the voltages $V_{121}$, $V_{122}$ to the common electrode 8M by the alternation of driving voltages carried out by the control signal M. The selected signal electrode voltage $V_{111}$ and $V_{112}$ are alternately and constantly applied to a selected one of the fixed pattern electrodes 8P, 8Q and 8R in the display parts 8a, 8b and 8c of the fixed pattern display part 8 as shown in FIG. 5C. FIG. 5D shows the voltages applied across the liquid crystal layer.

As is clear from FIG. 5, in the fixed pattern display part 8, the display device is driven in a static driving fashion, not in a time-multiplexed fashion. Therefore, no voltage is applied across the liquid crystal layer at a non-selected electrode part of the fixed pattern display part 8. Consequently, the fixed pattern display part 8 is free from the half-selected points which are inherent in the dot matrix display part 7, and there is no possibility of misreading.

It is possible to use a pair of transfer gates for the common electrode driving circuit 15.

In this embodiment, a combination of the dot matrix display system and the fixed pattern display system is employed, but the present invention is not restricted to this combination. A combination of the segment display system and the dot matrix display system is adaptable to the present invention. For example, it is possible to drive the display device by connecting the common electrodes arranged in the shape of the figure 8 as described above to the common electrode driving circuit 15 shown in FIG. 4, and each of the segment electrodes to the signal electrode driving circuit 30.

The present invention is realized simply by attaching a pair of transfer gates to a conventional device in place of commonly driving by a scanning electrode driving circuit, and thereby the contrast is improved several fold.

As has been described above, it is possible in accordance with the present invention to greatly improve the contrast of the fixed pattern display part and the segment display part, and a method for driving a liquid crystal display device providing a good display quality and a liquid crystal display device employing the method is thereby obtained.

What is claimed is:

1. A method for driving a liquid crystal display device which, in a liquid crystal panel, is provided with a dot matrix display part composed of a plurality of picture elements which are constituted as a dot matrix by intersections of scanning electrodes arranged in a striped pattern and signal electrodes also arranged in a striped pattern and opposed to said scanning electrodes, and a fixed pattern display part composed of at least one electrode arranged in a pattern that represents information and at least one electrode opposed to said electrode arranged in said pattern or a segment display part composed of a plurality of segment electrodes constituting said pattern and at least one electrode opposed to said segment electrodes, said method comprising the steps of:

sequentially selecting said scanning electrodes of said dot matrix display part, and applying a selected signal electrode voltage or a predetermined signal electrode voltage insufficient for selection to said signal electrodes of said dot matrix display part in accordance with information to be displayed, so that said dot matrix display part is driven in a time-multiplexed fashion; and constantly applying said predetermined signal electrode voltage to one electrode of an opposed pair of electrodes which constitute said fixed pattern display part or said segment display part, and applying said selected or predetermined signal electrode voltages to the other electrode of said opposed pair of electrodes which constitute said fixed pattern display part or said segment display part in accordance with the information to be displayed, so that said fixed pattern display part or said segment display part is driven in a static fashion.

2. A method according to claim 1, wherein said selected signal electrode voltage is alternately $V_{111}$ and $V_{112}$ with a predetermined period, said predetermined signal electrode voltage is alternately $V_{121}$ and $V_{122}$ with said predetermined period, and $$V_{121} = V_{111} + 2/a \, V_0$$

$$V_{122} = V_{112} - 2/a \, V_0$$

wherein $V_0$ is an amplitude of an alternating voltage applied across a liquid crystal layer at a selected picture element, a is an arbitrary constant larger than 3, and $V_{111}$ and $V_{112}$ are arbitrary values under the condition that $V_{111} \neq -1/a \, V_0$ and $V_{112} \neq -1/a \, V_0$.

3. A liquid crystal display device comprising:

a liquid crystal panel which is provided with a dot matrix display part composed of a plurality of picture elements which are constituted as a dot matrix by intersections of scanning electrodes arranged in a striped pattern and signal electrodes also arranged in a striped pattern and opposed to said scanning electrodes, and a fixed pattern display part composed of at least one electrode arranged in a pattern that represents information and at least one electrode opposed to said electrode arranged in said pattern or a segment display part composed of a plurality of segment electrodes constituting said pattern and at least one electrode opposed to said segment electrodes;

a scanning electrode driving circuit for sequentially selecting said scanning electrodes of said dot matrix display part;

a signal electrode driving circuit for applying a selected signal electrode voltage or a predetermined signal electrode voltage insufficient for selection to said signal electrodes of said dot matrix display part in accordance with information to be displayed;

first circuit means for applying said predetermined signal electrode voltage to one electrode of an opposed pair of electrodes which constitute said fixed pattern display part or said segment display part; and second circuit means for applying said selected or predetermined signal electrode voltages to the other electrode of said opposed pair of electrodes which constitute said fixed pattern display part or said segment display part in accordance with the information to be displayed.

4. A liquid crystal display device according to claim 3, wherein said selected signal electrode voltage is alternately $V_{111}$ and $V_{112}$ with a predetermined period, said predetermined signal electrode voltage is alternately $V_{121}$ and $V_{122}$ with said predetermined period, and $$V_{121} = V_{111} + 2/a \, V_0$$

$$V_{122} = V_{112} - 2/a \, V_0$$

where $V_0$ is an amplitude of an alternating voltage applied across a liquid crystal layer at a selected picture element, a is an arbitrary constant larger than 3, and $V_{111}$ and $V_{112}$ are arbitrary values under the condition that $V_{111} \neq -1/a \, V_0$ and $V_{112} \neq -1/a \, V_0$.

* * * * *